(12) United States Patent
Williams (10) Patent No.: US 10,774,862 B2
(45) Date of Patent: Sep. 15, 2020

(54) FIXING DEVICE

(71) Applicant: Gareth Percy Williams, Shawbury (GB)

(72) Inventor: Gareth Percy Williams, Shawbury (GB)

( * ) Notice: Subject to any disclaimer, the term of this patent is extended or adjusted under 35 U.S.C. 154(b) by 0 days.

(21) Appl. No.: 15/569,190

(22) PCT Filed: Apr. 18, 2016

(86) PCT No.: PCT/GB2016/051069
§ 371 (c)(1),
(2) Date: Oct. 25, 2017

(87) PCT Pub. No.: WO2016/177993
PCT Pub. Date: Nov. 10, 2016

(65) Prior Publication Data
US 2018/0112697 A1    Apr. 26, 2018

(30) Foreign Application Priority Data

May 1, 2015 (GB) .................................. 1507546.8

(51) Int. Cl.
*F16B 21/00* (2006.01)
*F16B 13/08* (2006.01)
*F16B 37/04* (2006.01)

(52) U.S. Cl.
CPC ........ *F16B 13/0808* (2013.01); *F16B 37/041* (2013.01)

(58) Field of Classification Search
USPC ....................................................... 411/344
See application file for complete search history.

(56) References Cited

U.S. PATENT DOCUMENTS 1,493,197 A * 5/1924 Hall .................... F16B 13/0808
                                                      411/340
2,765,134 A    10/1956 Hill
3,513,746 A *  5/1970 Raynor .............. F16B 13/0808
                                                      411/346
4,183,386 A *  1/1980 Brown ............... F16B 13/0808
                                                      411/176

(Continued)

FOREIGN PATENT DOCUMENTS

GB        990158 A     4/1965
GB        992179 A     5/1965

OTHER PUBLICATIONS

EPO/ISA, Search Report and Written Opinion, Int'l Appln No. PCT/GB2016/051069, dated Jul. 11, 2016, 8 pages.

(Continued)

*Primary Examiner* — Gary W Estremsky
(74) *Attorney, Agent, or Firm* — Umberg Zipser LLP (57) ABSTRACT

A fixing device for securing into a hole (30) in plasterboard and providing an anchor point for affixing a load to said plasterboard, the device comprising: —a body (12) configured to be retainable in said hole; and —a resiliently flexible, elongate bracing member (10) of length greater than an axial dimension of said body (12) and having an opening for receiving an external retention device (28, 128) for enabling manual retention of said bracing member (10) in a bracing position with an inner surface thereof against the rear of said plasterboard, in use, after insertion thereof through said hole (30).

18 Claims, 12 Drawing Sheets

(56) References Cited

U.S. PATENT DOCUMENTS

| | | | | |
|---|---|---|---|---|
| 4,245,545 A * | 1/1981 | Freeman | ............ | F16B 13/0808 |
| | | | | 411/29 |
| 4,286,497 A * | 9/1981 | Shamah | ................. | F16B 37/04 |
| | | | | 411/342 |
| 4,865,501 A * | 9/1989 | Ferris | ................. | F16B 13/0808 |
| | | | | 411/340 |
| 5,209,621 A * | 5/1993 | Burbidge | ............ | F16B 13/0808 |
| | | | | 411/340 |
| 5,236,293 A | 8/1993 | McSherry et al. | | |
| 5,702,218 A * | 12/1997 | Onofrio | ................. | E04B 9/006 |
| | | | | 411/341 |
| 6,213,701 B1 * | 4/2001 | Ukai | ................... | F16B 13/0833 |
| | | | | 411/340 |
| 7,828,501 B2 * | 11/2010 | Bauer | ................ | F16B 13/0808 |
| | | | | 411/258 |
| 8,807,899 B2 * | 8/2014 | Spencer, Jr. | ......... | A47K 17/022 |
| | | | | 411/344 |
| 9,212,677 B2 * | 12/2015 | Owen | ................... | F16L 3/2332 |
| 2006/0088399 A1 * | 4/2006 | Demeo | .............. | F16B 13/0808 |
| | | | | 411/340 |

OTHER PUBLICATIONS

UK Intellectual Property Office, search report for Application No. GB1507546.8, dated Jun. 11, 2015, 3 pages.

\* cited by examiner

FIXING DEVICE

This invention relates to a fixing device, a method of manufacture thereof, and a fixing kit and method for securing a fixing device to a surface. More particularly, but not necessarily exclusively, the present invention relates to a fixing device for providing an anchor point on plasterboard cavity walls and ceilings to enable loads, such as shelves, radiators, cupboards and the like, to be affixed thereto.

It is well known to employ a fixing device to provide an anchor point on plasterboard cavity walls and ceilings, for receiving a screw (or similar fixing means) that enables another item to be affixed thereto. One of the simplest and most widely used of such known fixing devices is termed in the art a wall or 'rawl' plug, and comprises a tapered tube of resiliently flexible plastic material which is inserted into a drilled hole and a screw tightened into the centre, whereby the screwing action wedges the plug firmly in place with the plastic material conforming tightly to the surrounding wall.

However, problems arise, particularly when the wall is insufficiently thick to retain the full length of the tube, with heavier loads, such as radiators and the like, whereby the anchor point provided by the wall plug is of insufficient strength to counteract the weight of the load, and the weight of the load causes the fixing means and plug to be pulled out of the drilled hole, often together with portions of the wall surrounding the hole, thereby damaging the wall.

Various proposals have been made to attempt to address this issue, amongst others. For example, one known fixing device comprises a cylindrical body having a central aperture extending longitudinally therethrough, for receiving a screw or other fixing means. A passage is provided on either side of the central aperture, and a rotatable shaft is located in each of the passages. A metal retaining arm is coupled at one end of each of the rotatable shafts, and a screw drive is provided at the other end of each shaft for enabling the shaft to be rotated such that the respective retaining arm can be accordingly moved from a retracted position to an extended position in which it extends radially outward from the side of the body. In use, and with the retaining arms in the retracted position, the body is inserted into a hole in a plasterboard cavity wall and the screw drives are then employed to rotate the retaining arms to the above-mentioned extended position (at the rear of the plasterboard) in which they project radially away from the body with a view to maximising the contact surface area with the rear of the plasterboard. Once fitted in this manner, the central aperture can be used to receive a screw or other fixing means to affix a load to the wall.

The arrangement described above seeks to enable loads to be securely affixed to a structure without the drawbacks associated with conventional devices. However, the arrangement is relatively complex, with a number of moving parts, which may also lead to increased potential for mechanical failure. Furthermore, the compressive strain created between the retaining arms and the rear of the plasterboard wall results from the tightening of the central screw when the load is affixed to the wall via the device. Thus, the majority of the strain counteracting the load is centred relative to the device, whereas there is no actual surface contact with the rear of the plasterboard at the centre of the device between the two retaining arms, and a particularly heavy load can, therefore, cause the device to fail and/or be pulled out of the wall.

It is an object of aspects of the present invention to address at least some of these issues, and in accordance with one aspect of the present invention, there is provided a fixing device for securing into a hole in plasterboard and providing an anchor point for affixing a load to said plasterboard, the device comprising:

a body configured to be retainable in said hole; and a resiliently flexible, elongate bracing member of length greater than an axial dimension of said body and having an opening for receiving an external retention device for enabling manual retention of said bracing member in a bracing position against the rear of said plasterboard, in use, after insertion thereof through said hole; said body and said bracing member each having at least one aperture extending longitudinally therein, said apertures being located on said body and said bracing member respectively for longitudinal alignment, in use, when said body is retained in said hole and said bracing member is in said bracing position so as to define a channel for receiving an attachment device for attaching said bracing member to said body.

The inner surface of said bracing member may be generally concave.

The bracing member may have a generally central portion of substantially uniform thickness, and end portions extending from said central portion, said end portions tapering to a smaller thickness at their distal ends. In one exemplary embodiment of the present invention, the end portions may extend from the central portions at an angle of around 10°.

The bracing member may be formed of plastics material that is sufficiently resiliently flexible to flex under force. The central portion and end portions may be integrally moulded.

In an exemplary embodiment, the bracing member may comprise a generally central portion formed of at least two layers of material, and single-layered end portions extending at an angle from said central portion. The bracing member may be formed of metal or wood.

In another exemplary embodiment, the bracing member may comprise a centre portion and end portions extending at an angle from said centre portion, the thickness of said centre portion and said end portions being substantially equal, wherein at least one ridge, in the form of a longitudinal indented portion, is provided on the inner surface of said centre portion. Optionally, two parallel indented portions are provided on the inner surface of said centre portion (thereby forming corresponding parallel ridges on the outer surface of the centre portion).

A fixing device according to some exemplary embodiments may comprise a gripping member at or adjacent the distal end of each of said end portions. In one specific exemplary embodiment of the invention, the fixing device may comprise a pair of laterally opposing gripping members at or adjacent the distal end of each of said end portions. The gripping members may comprise, for example, barbs or substantially conical spikes configured to pierce the rear surface of said plasterboard, in use, when a force is exerted on said bracing member when in said bracing position.

The body may comprise a generally cylindrical insert portion configured to be inserted into said hole. In one exemplary embodiment, the body may comprise a cover portion at one end thereof, having a diameter greater than that of said insert portion and extending circumferentially beyond the side edges of said insert portion.

Said body and said bracing member may each have a pair of apertures extending longitudinally therein, each aperture on said body being located for longitudinal alignment with a corresponding aperture on said bracing member, in use, when said body is retained in said hole and said bracing member is in said bracing position so as to define a pair of respective channels, each for receiving an attachment device for attaching said bracing member to said body. The pair of apertures on said body may be located on opposing sides of a generally central point thereof, along a diametric axial axis thereof. In one exemplary embodiment, the pair of apertures on said bracing member may be located on opposing sides of a generally central point thereof, along a longitudinal axis thereof.

The fixing device may comprise a retention cord threaded through corresponding pairs of apertures between said body and said bracing member to form a retaining loop across an outer surface of said bracing member with free ends thereof extending through the apertures in said body and configured to enable a user, in use when said inner surface of said bracing member is against the rear of said plasterboard, to exert a force on said outer surface of said bracing member by pulling said free ends. In an alternative exemplary embodiment, the fixing device may comprise a pair of flexible tape members, optionally formed of plastic or nylon material, each with a series of spaced apart ridges or teeth formed along at least a portion of its length. Each retention tape may be provided with a stop member at one end thereof. In this case, the body may be provided with at least one ratchet member extending radially inwardly within each of said pair of apertures. In an exemplary embodiment, a pair of opposing, staggered ratchet members may be provided within each one of said pair of apertures, which ratchet members are configured to allow substantially free movement of a respective tape member within a respective aperture when pulling the free end thereof, and to prevent movement in the opposing direction. The free end of each tape member may be configured to be broken or snapped off, once the bracing member has been pulled tightly against the rear of the plasterboard. Alternatively, or in addition, the body may be provided with cutting means at or adjacent each of said pair of apertures, where, in use, said free ends of said tape members exit said apertures, to enable said free ends of said tape members to be cut once the bracing member has been pulled tightly against the rear of the plasterboard.

The body and the bracing member may further comprise a respective generally central aperture, said generally central apertures being configured for alignment, in use, when said body is retained in said hole and said bracing member is in said bracing position so as to define a channel for receiving an attachment device for attaching said load to said plasterboard.

In one exemplary embodiment, the attachment device may comprise a cable tie.

In accordance with another aspect of the present invention, there is provided a fixing kit for providing an anchor point for affixing a load to plasterboard, the kit comprising a fixing device according to any of the preceding claims and an attachment device configured to be received in said channel to attach said bracing member to said body.

In accordance with yet another aspect of the invention, there is provided a method of providing an anchor point for affixing a load to plasterboard, the method comprising:
  forming a hole in said plasterboard;
  providing a fixing device substantially as described above;
  inserting said bracing member through said hole into a cavity behind said plasterboard and pulling said attachment means so as to locate said bracing member in contact with the rear of said plasterboard;
  inserting said body into said hole and affixing said body to said bracing member.

These and other aspects of the present invention will be apparent from the following specific description in which embodiments of the present invention are described, by way of examples only, and with reference to the accompanying drawings, in which:

FIG. 9a is a schematic perspective view of a fixing device according to an exemplary embodiment of the present invention;

FIG. 9b is a schematic partial cross-sectional view of the fixing device of FIG. 9a;

FIG. 13b is a schematic front view of the body of the fixing device of FIG. 13a.

Figure 1A:
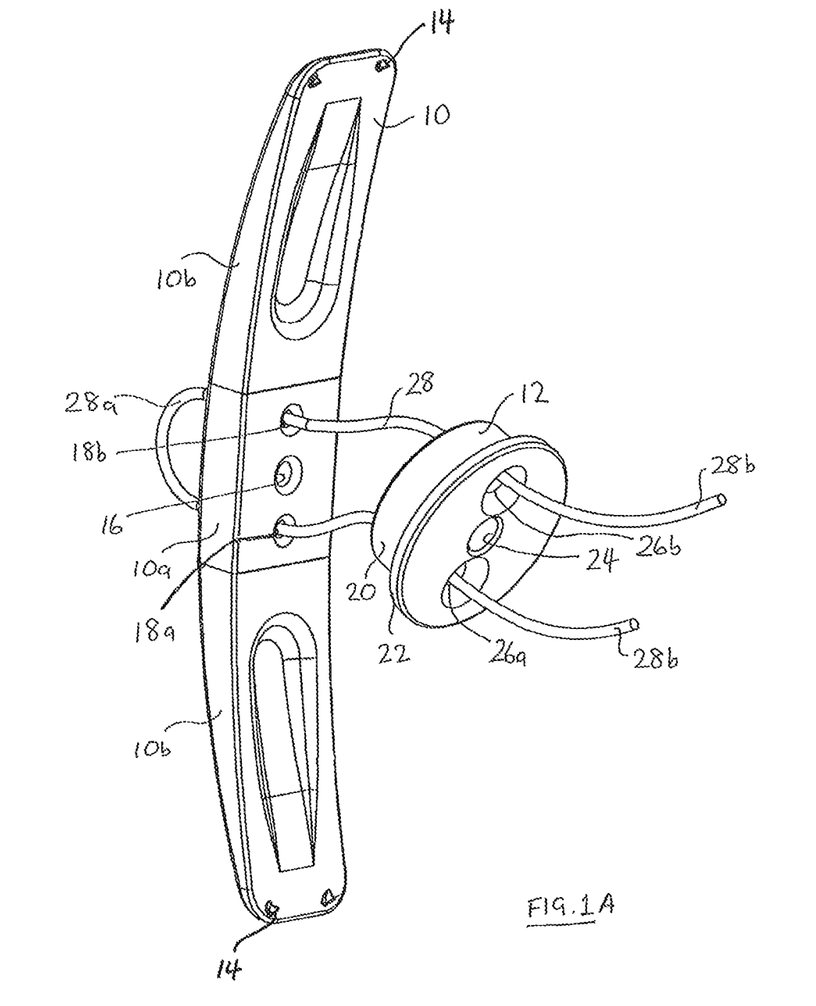
FIG. 1A is a schematic perspective view of a fixing device according to an exemplary embodiment of the present invention.
Figures 1B, 2:
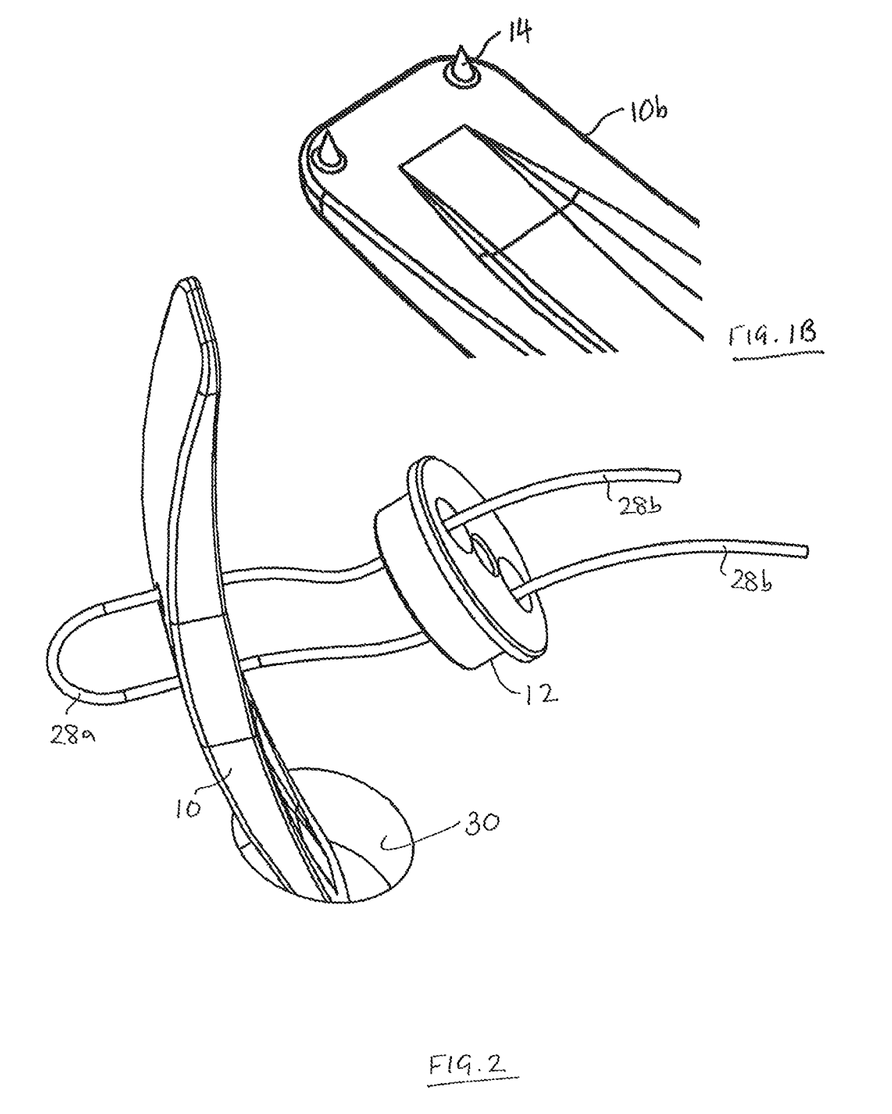
FIG. 1B is a schematic partial view of an end portion of the fixing device of FIG. 1A, illustrating the gripping members at the end thereof.
FIG. 2 is a schematic diagram illustrating the fixing device of FIG. 1 with the bracing member being inserted into the hole in plasterboard.

Referring to FIG. 1 of the drawings, a fixing device according to an exemplary embodiment of the present invention comprises an elongate bracing member 10 and a body 12. The bracing member 10 is of length greater than an axial dimension of the body 10, in this case its diameter, and, in this exemplary embodiment of the present invention, comprises an integrally moulded member having a central section 10a of substantially uniform thickness and a tapered end section 10b on each side of the central section 10a. The bracing member 10 is formed of a resiliently flexible material, such as nylon or polypropylene, which is essentially rigid when no force is applied to it, but has a degree of resilient flexibility under force. A set of pointed, substantially conical gripping members 14 is provided on the inner surface of the bracing member 10 (the inner surface being used to refer to the surface that is in contact with the rear of a plasterboard wall, in use), with a pair of laterally opposing gripping members 14 being positioned at or close to each of the distal ends of the bracing member 10. At least the end sections 10b of the bracing member 10 are curved relative to the longitudinal axis of the bracing member, the angle being around 10° in the example shown, although the present invention is not necessarily intended to be limited in this regard. The curved configuration of the bracing member 10 (i.e. the substantially concave configuration of the inner surface of the bracing member 10) is intended to enable the bracing member to be completely inserted through a hole in a plasterboard cavity wall, without the need to provide a cavity greater than that considered acceptable in the art to accommodate it.

The central section 10a of the bracing member 10 is provided with three, substantially longitudinally aligned apertures 16, 18a, 18b: a generally central aperture 16 and two side apertures 18a, 18b located on opposing sides of the central aperture 16 and substantially equi-distantly spaced apart therefrom.

The body 12 comprises a substantially cylindrical insert portion 20 and a cover portion 22 having a diameter greater than that of the insert portion such that it extends laterally beyond the circumferential edges of the insert portion. The body 12 is provided with three, substantially diametrically aligned apertures 24, 26a, 26b: a generally central aperture 24 and two side apertures 26a, 26b located on opposing sides of the central aperture 24 and substantially equi-distantly spaced therefrom.

A temporary retaining cord 28 is threaded through a first side aperture 26a on the body and through a corresponding side aperture 18a on the bracing aperture, and then doubled back and threaded through the second side aperture 18b on the bracing member and through the second side aperture 26b on the body, such that a loop 28a is formed on the outer surface of the bracing member 10, between the two side apertures 18a, 18b thereon, and the free ends 28b of the cord 28 extend out of the two side apertures 18a, 18b on the body 12, as illustrated. Thus, the bracing member 10 and the body 12 are loosely held together by the cord 28 prior to use.

Figure 3:
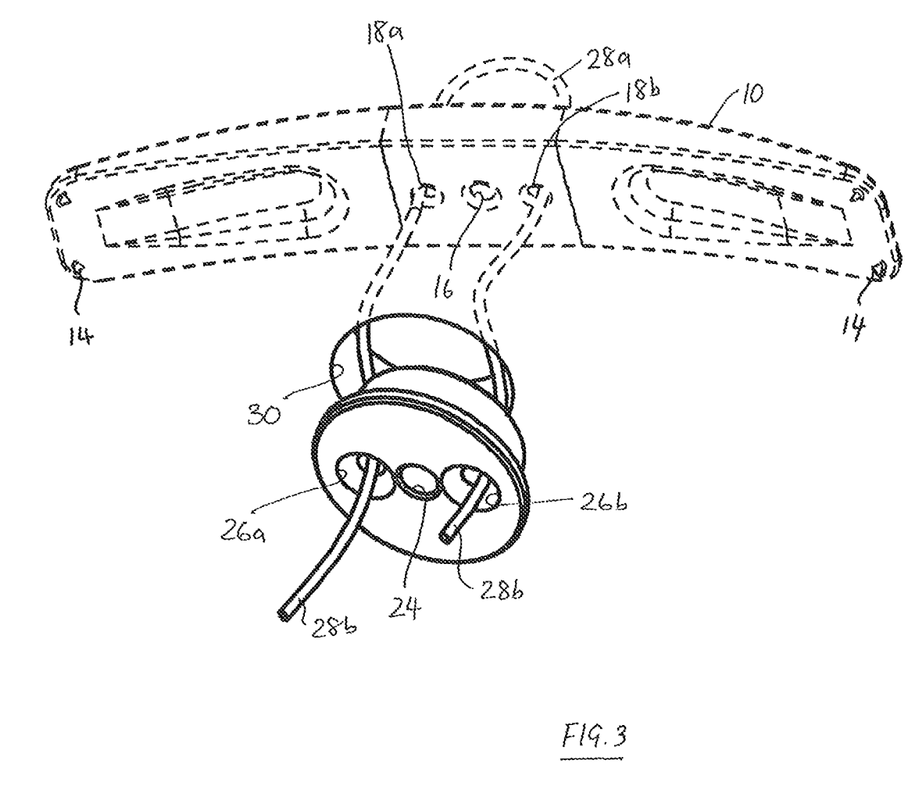
FIG. 3 is a schematic diagram illustrating the fixing device of FIG. 1 with the bracing member in location at the rear of the plasterboard.

Referring to FIG. 2 of the drawings, in use, the bracing member 10 is first inserted into a hole 30 in a plasterboard cavity wall and pushed through until the whole bracing member is located behind the plasterboard, with the body 12 located externally of the plasterboard, as illustrated schematically in FIG. 3 of the drawings (with the dotted lines intended to illustrate the portions of the device that are now behind the plasterboard).

The user holds the free ends 28b of the retaining cord 28 and pulls the bracing member 10 toward them until it is in a bracing position against the rear of the plasterboard, which may, of course, be at any angle relative to the horizontal and/or vertical axis of the plasterboard, but is most conveniently either substantially horizontally (as shown in FIG. 3) or substantially vertically relative to the plasterboard wall. As a result of this action, the gripping members 14 at the distal ends of the inner surface of the bracing member 10 pierce the rear of the plasterboard, thereby serving to provide purchase points and fixing the orientation of the bracing member 10 and prevent rotation thereof relative to the desired orientation. Once the bracing member 10 is thus fixed in the correct orientation against the rear of the plasterboard, the insert portion 20 can be inserted into, for retention in, the hole 30, with the cover portion 22 remaining on the outer surface of the plasterboard, and covering the peripheral edge of the hole.

Figure 4:
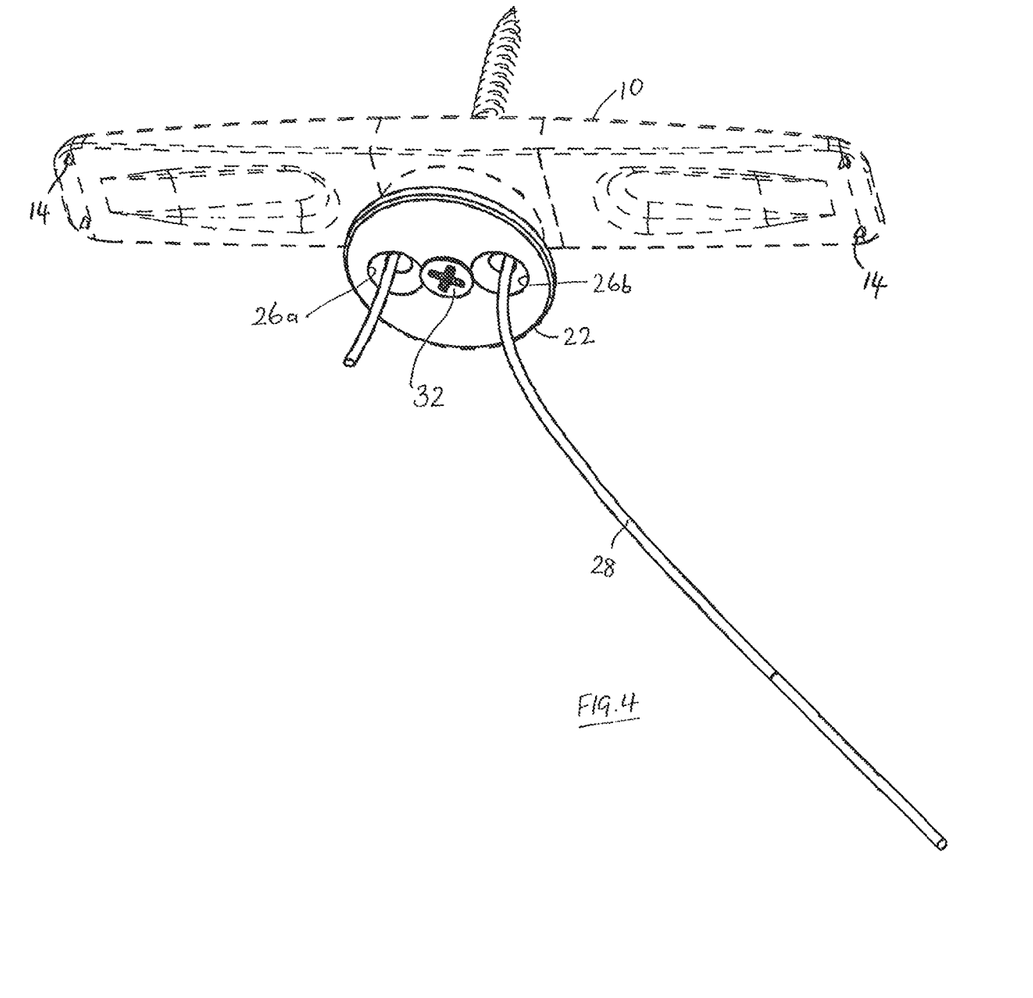
FIG. 4 is a schematic diagram illustrating the fixing device of FIG. 1 with the body inserted in the hole in the plasterboard.

The user then continues to pull the retention cord 28 so as to slightly flex the bracing member 10 against the rear of the plasterboard and create an initial compressive strain therebetween and a screw 32 (or other fixing means) is introduced into the assembly via the generally central aperture 24 in the body 10 and screwed through the assembly into the generally central aperture 16 in the bracing member and tightened to further pull the body 12 and bracing member together and cause further flexing of the bracing member 10, until the screw head is flush against the cover portion 22 of the body 10 and the screw cannot extend any further into the assembly, thus holding the bracing member 10 in the bracing position with the inner surface thereof substantially flat against the rear of the plasterboard (see FIG. 4, in which it can be seen that the curved inner surface of the bracing member 10 is now flat and braced against the rear of the plasterboard).

Figure 5:
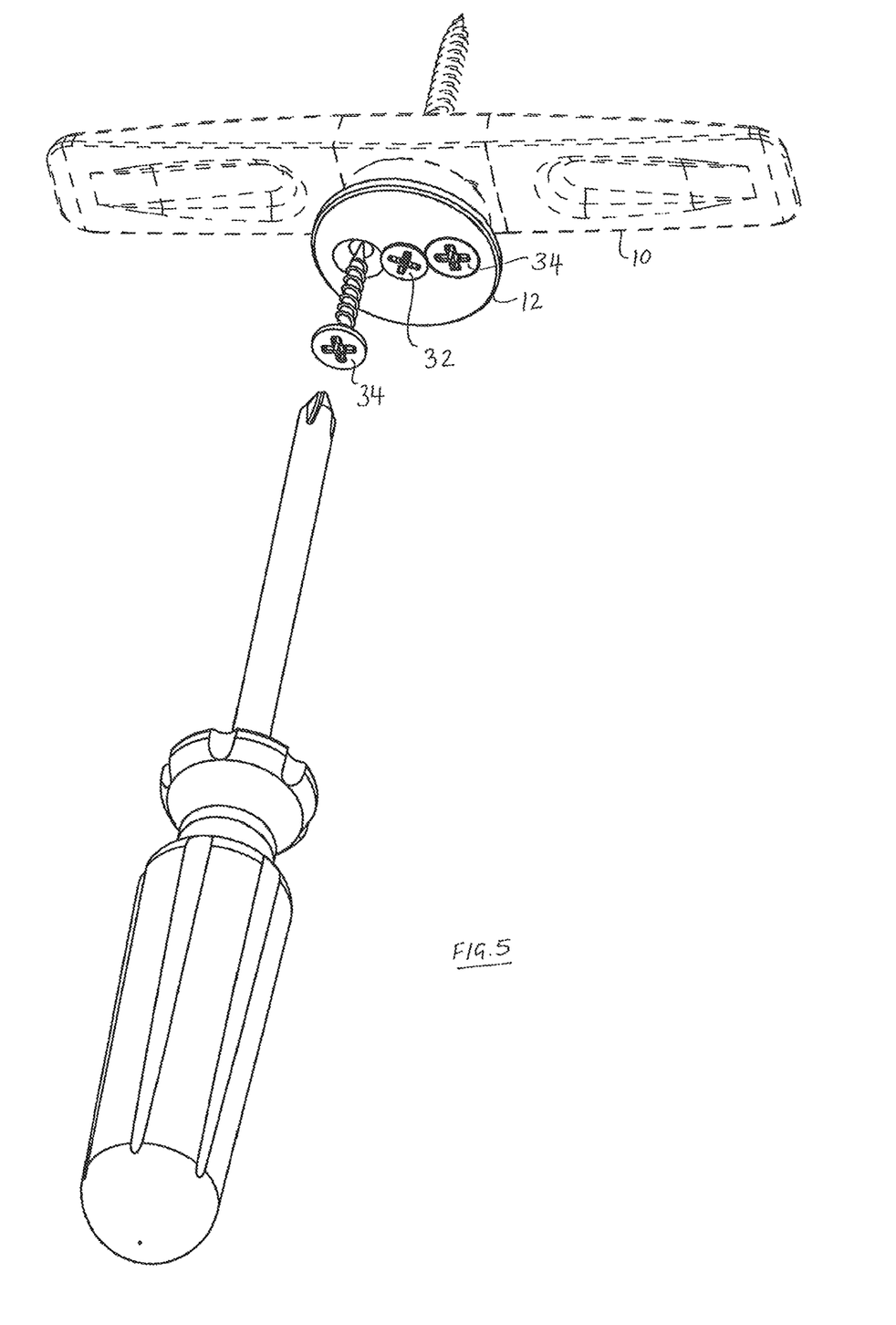
FIG. 5 is a schematic diagram illustrating the fixing device of FIG. 1, after the retaining cord has been removed, during the process of affixing the body to the bracing member.
Figure 6:
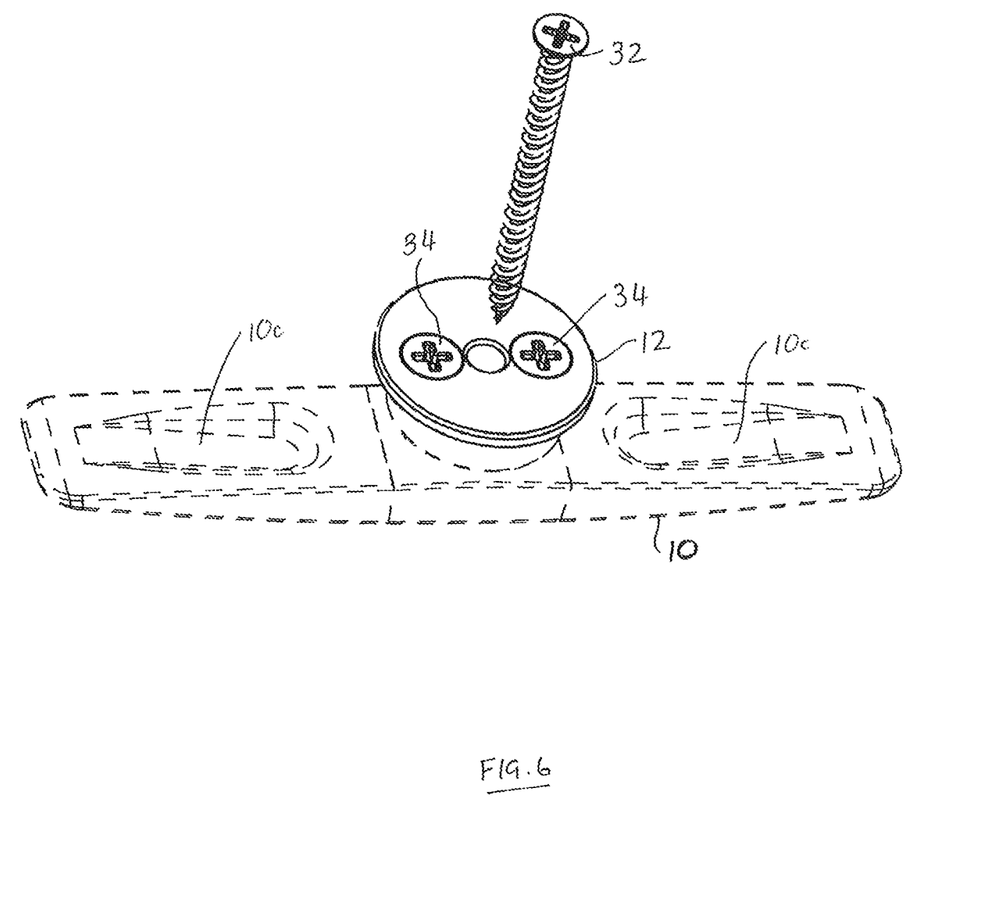
FIG. 6 is a schematic diagram illustrating the final step of securing the fixing device of FIG. 1 to a plasterboard cavity wall, in use whereby the central screw is removed.

Next, and referring to FIG. 5 of the drawings (in which the gripping members have been omitted for clarity), the retention cord 28 can be removed, by pulling one of the free ends 28b, and a pair of screws 34 (or other fixing means) inserted into the side apertures 26a, 26b and screwed through the assembly into the corresponding side apertures 18a, 18b in the bracing member, once again acting to secure the body 12 and the bracing member 10 together. Finally, and referring to FIG. 6 of the drawings (in which, once again, the gripping members have been omitted for clarity), the central screw 32 can be removed, leaving the central apertures 16, 24 of the body 12 and bracing member 10 respectively free for use in receiving the fixing means for affixing a load to the device.

One of the principal advantages of the side screws 34 in the above embodiment is that the force of the load subsequently attached to the device is transferred from the centre of the device and, instead, spread more evenly across the device, toward the edges. Furthermore, the device described above can be used in relatively shallow cavities, due to the configuration of the bracing member. There is no need for the use of special screws to fix the load to the device: the device can be configured to receive off-the-shelf screw sizes, and the apertures therein may be pre-drilled to accept the size of screw to be used without the need for special inserts in the bracing member. The apertures 26a, 26b are counter sunk, in the illustrated embodiment, such that when the screws are fully tightened, they are flush with the outer surface of cover portion 22 of the body 12.

It will be apparent to a person skilled in the art, from the foregoing description, that modifications and variations can be made to the described embodiment without departing from the scope of the invention as defined in the appended claims. For example, in an exemplary embodiment of the present invention, the retention cord could be replaced by a pair of cable ties, loosely connected between the body 12 and the bracing member 10 through corresponding side apertures thereof. In this case, the cable ties can be pulled to brace the bracing member against the rear of the plasterboard prior to the insert portion of the body 10 being inserted into the hole, and then subsequently pulled tight and locked to secure the bracing member and body together. Once secured, the free ends of the cable ties can be cut off. Thus, the cable ties perform the dual functions of the retention cord 24 and the side screws 34 of the above-described embodiment.

Figures 9A, 9B:
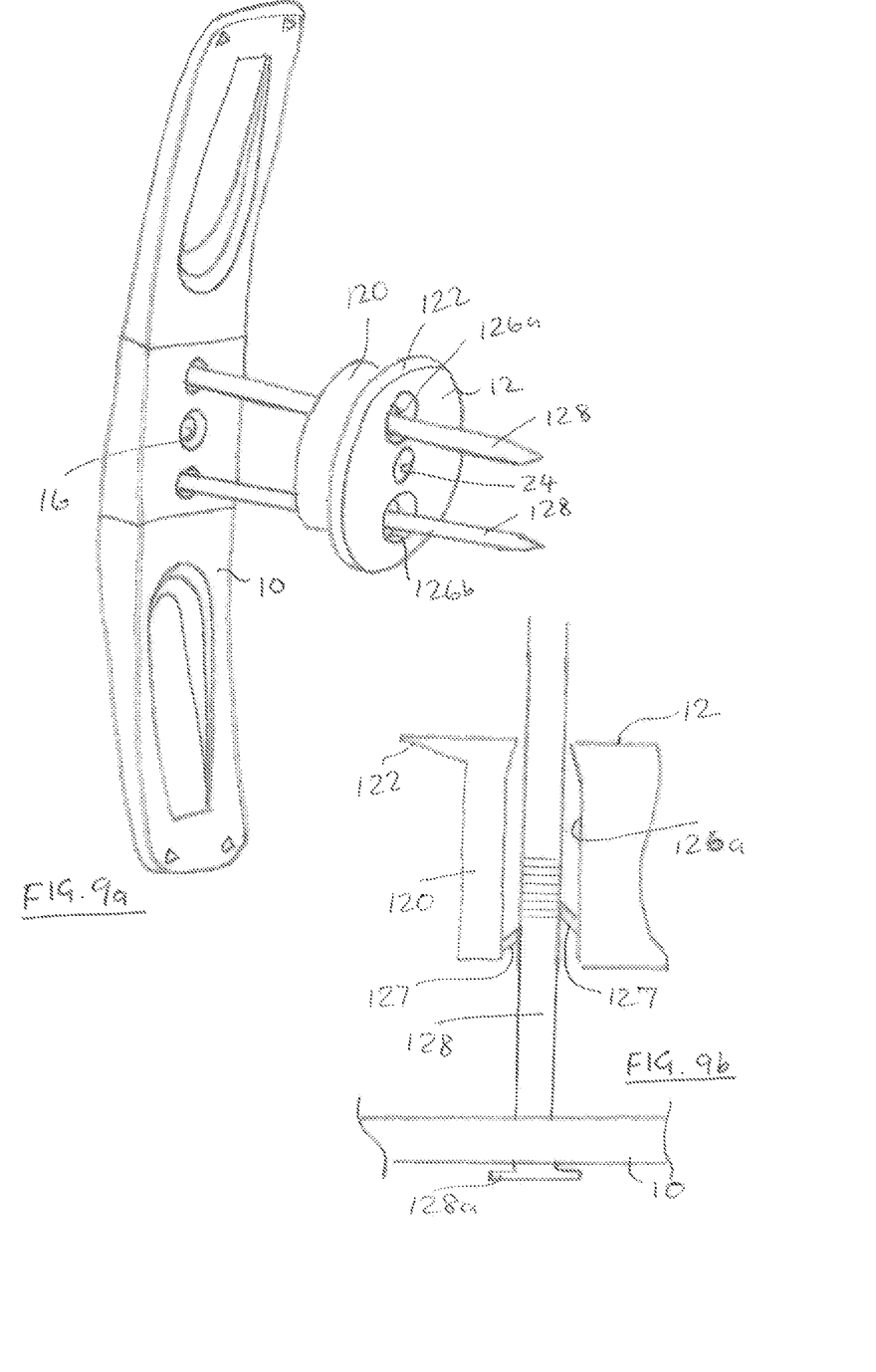

Thus, referring to FIGS. 9a and 9b of the drawings, in another exemplary embodiment of the present invention, the bracing member 10 may be substantially the same as in the other embodiments described herein. However, the body 12 may be slightly different. In this case, the body 12 may still comprise a substantially cylindrical insert portion 120 and a cover portion 122 having a diameter greater than that of the insert portion such that it extends laterally beyond the circumferential edges of the insert portion. There are, once again, three substantially diametrically aligned apertures 124, 126a, 126b: a generally central aperture 124 and two side apertures 126a, 126b located on opposing sides of the central aperture 124 and spaced equi-distantly therefrom. In this case, the side apertures 126a, 126b may be generally circular once again, or they may have another cross-sectional shape, such as rectangular, to match the cross-sectional shape of the retention cord or tape to be passed therethrough.

Figure 8:
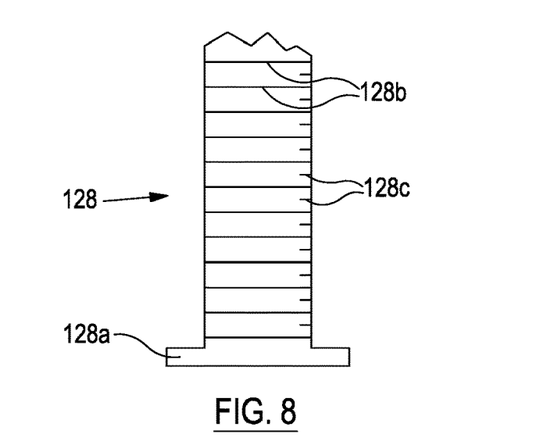
FIG. 8 is a schematic partial front view of a retention tape for use in an exemplary embodiment of the present invention.

The retaining 'cord' is replaced in this case by a pair of nylon or plastic tapes 128 of the type used in, for example, cable ties and the like. The inner profile of each side aperture 126a, 126b may be substantially linear and uniform from the end of the insert portion 120 (furthest from the cover portion 122) to a point close to the cover portion end, where it is angled radially inward (relative to the channel defined by the respective aperture 126a, 126b) to define a tapered channel portion 125a of decreasing diameter. Within the wider, uniform channel portion 125b, two ratchet members 127 are provided, that extend, at an angle radially inwardly (and may, for example, be in the form of teeth or similar angled protrusions). The ratchet members 27 are located substantially diametrically opposite each other, at staggered locations on the inner wall of the aperture channel. The ratchet members 127 extend radially inwardly from the channel wall, at an angle, toward the cover portion end of the body 12, thus permitting free passage of the table 28 in the direction toward the cover portion end of the body 12, and preventing movement of the tape 128 in the opposite direction (away from the cover portion 122) by engagement thereof with closely spaced ridges 128b (FIG. 8) or teeth provided along the surface of the tape 128. In this case, instead of a single retention cord looped through the two apertures 126a, 126b, a single respective tape 128 (having a stop member 128a, FIG. 8 at one end thereof) may be threaded through each side aperture 18a, 18b on the bracing member 10 and then through each respective side aperture 126a, 126b on the body 12 (in the direction toward the cover portion 122 thereof), until the free end of each tape 128 extends beyond the outer face of the cover portion 122. It will be appreciated that the stop member 128a may simply be the ratchet portion of a conventional cable tie, although the tape 128 may alternatively comprise a custome made device having a stop member formed integrally at one end thereof.

Figure 10:
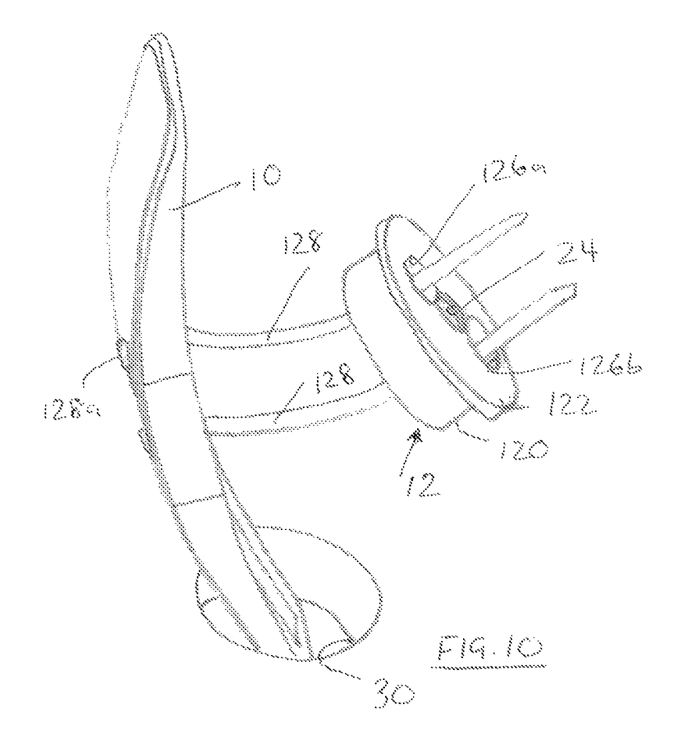
FIG. 10 is a schematic perspective view of the fixing device of FIG. 9a with the bracing member being inserted into the hole in plasterboard.

In use, and still referring to FIGS. 9a and 9b of the drawings, a single retention tape 128 (including a respective stop member 128a) is inserted (from the convex face) through a respective side aperture 18a, 18b of the bracing member 10, until the respective stop member 128a abuts the outer (concave) face of the bracing member 10. Next, the body 12 is slotted over the free ends of the tapes 128 such that the retention tapes 128 are pushed through the corresponding side apertures 126a, 126b thereof, until the free ends of the tapes 128 extend beyond the outer face of the cover portion 122 and, initially, leaving a length of the tapes 128 between the body 12 and the bracing member 10. This allows that length of tapes, extending between the body and the bracing member to be bent and flexed, to enable the bracing member 10 to be inserted through a hole 30 in the wall as before, as shown in FIG. 10 of the drawings.

Figure 11:
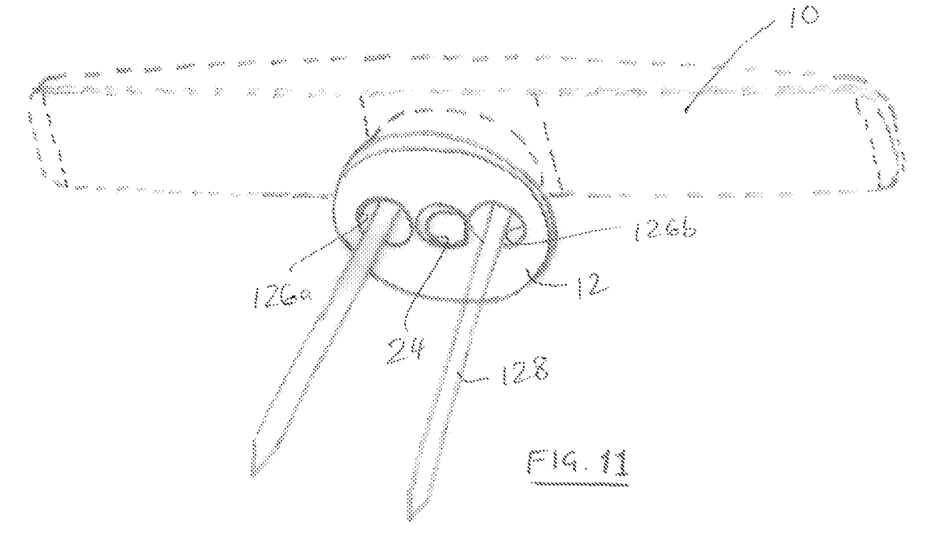
FIG. 11 is a schematic perspective view of the fixing device of FIG. 9a with the bracing member in location at the rear of the plasterboard.

The user can then hold and pull the free ends of the tapes 128 (with one hand) so as to slightly flex the bracing member 10 against the rear of the plasterboard and push the body 12 toward the hole 30 in the wall, by sliding it along the tapes 128. The insert portion 120 of the body 12 can then be inserted into, for retention in, the hole 30, with the cover portion 122 remaining on the outer surface of the plasterboard and covering the peripheral edge of the hole 30. The compressive strain between the bracing member 10 and the body 12 is maintained by the retention tapes 128 therebetween, which are prevented from movement in the opposite direction (an thus releasing the compressive strain) by the ratchet members 127 within the apertures 126a, 126b (see FIG. 11 of the drawings).

Figure 12:
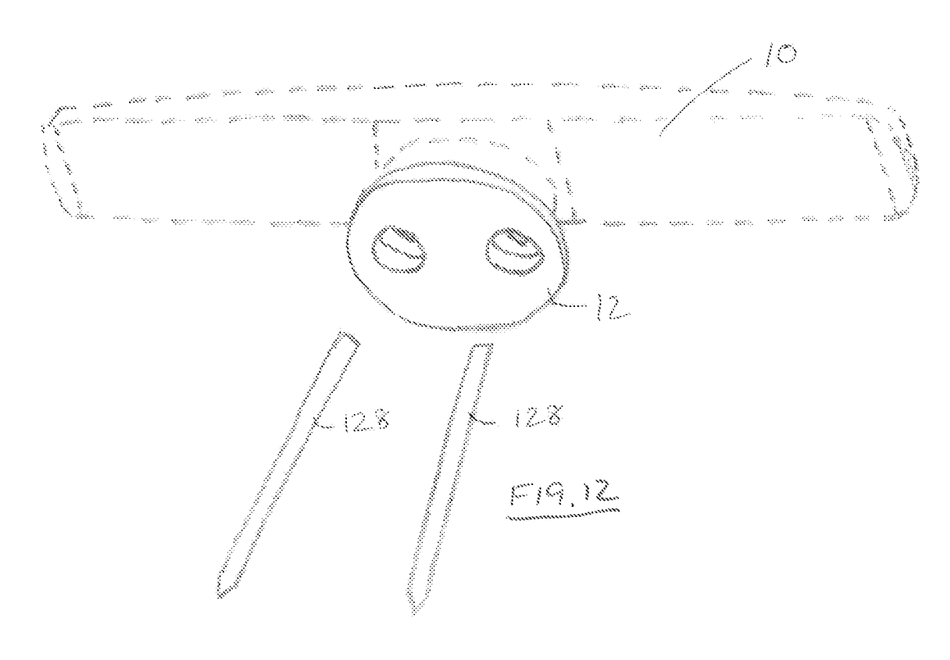
FIG. 12 is a schematic perspective view of the fixing device of FIG. 9a with the body inserted in the hole in the plasterboard.

Next, the free ends of the retention tapes 128 can be removed. In a first exemplary embodiment, the tapes 128 may include cuts, nicks or other weakened portions (128c, FIG. 8) to enable a user to simply snap the free ends off by twisting or applying a manual force thereto (see FIG. 12). Of course, in other embodiments, they may simply be cut by scissors or a knife as required.

Figure 13A:
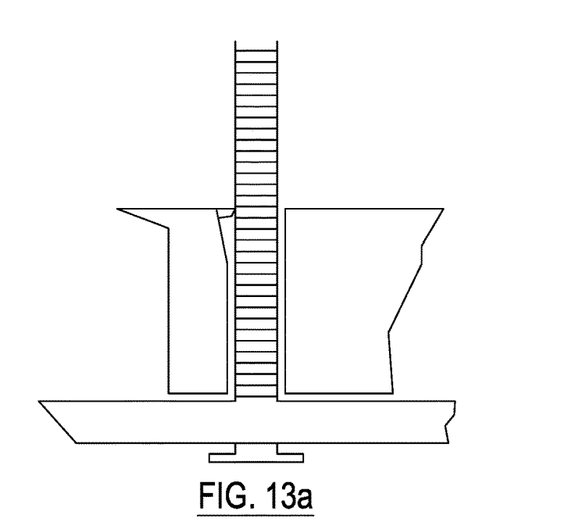
FIG. 13a is a schematic partial cross-sectional view of a fixing device according to an exemplary embodiment of the present invention.
Figure 13B:
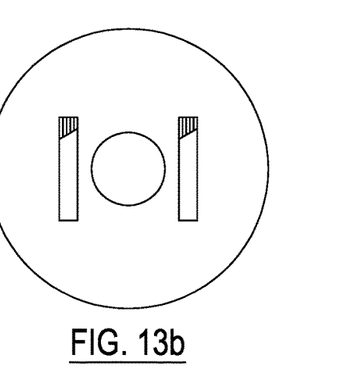

In yet another exemplary embodiment, and referring to FIGS. 13a and 13b of the drawings, a cutting means such as a blade 140 may be provided at the periphery of the side apertures 126a, 126b in the body 12 (at the cover portion end) to enable the free ends of the retention tapes 128 to be cut at a point substantially flush with the aperture exit. Also shown in FIG. 13a is an alternative configuration between the cover portion 122 and the insert portion 120. It can be seen in this case that then outer surface of the body 12 is tapered from the front (i.e. the "cover portion") back toward the insert portion. This configuration allows the cover portion to sit flush with the outer surface of the plasterboard whilst the tapering prevents the rim (or cover portion) from gull winging when tightened. It will be appreciated that this tapered profiling between the rim or cover portion and the insert portion can be adopted in any of the previous embodiments as an alternative configuration.

Either way, it can be seen that, in this case, there is no need for the central screw (32, FIG. 4) to be used to temporarily hold the bracing member 10 and body 12 in compressive strain—this is achieved by the flexed and retained retention tapes 128 in stead, thereby further simplifying the procedure.

In other exemplary embodiments, at least the bracing member may be formed of other materials, such as metal or wood. In this case, the central portion may be provided in the form of two or more layers of material and the end portions extending therefrom may be angled (rather than curved) with barbs being provided at the distal ends thereof to form the gripping members. The layered configuration of the central portion and the angled end portions are intended, once again, to prevent the centre portion from collapsing at the centre fixing screw which may, otherwise, cause the bracing member to "gull wing" during tightening of the centre fixing screw.

Figure 7:
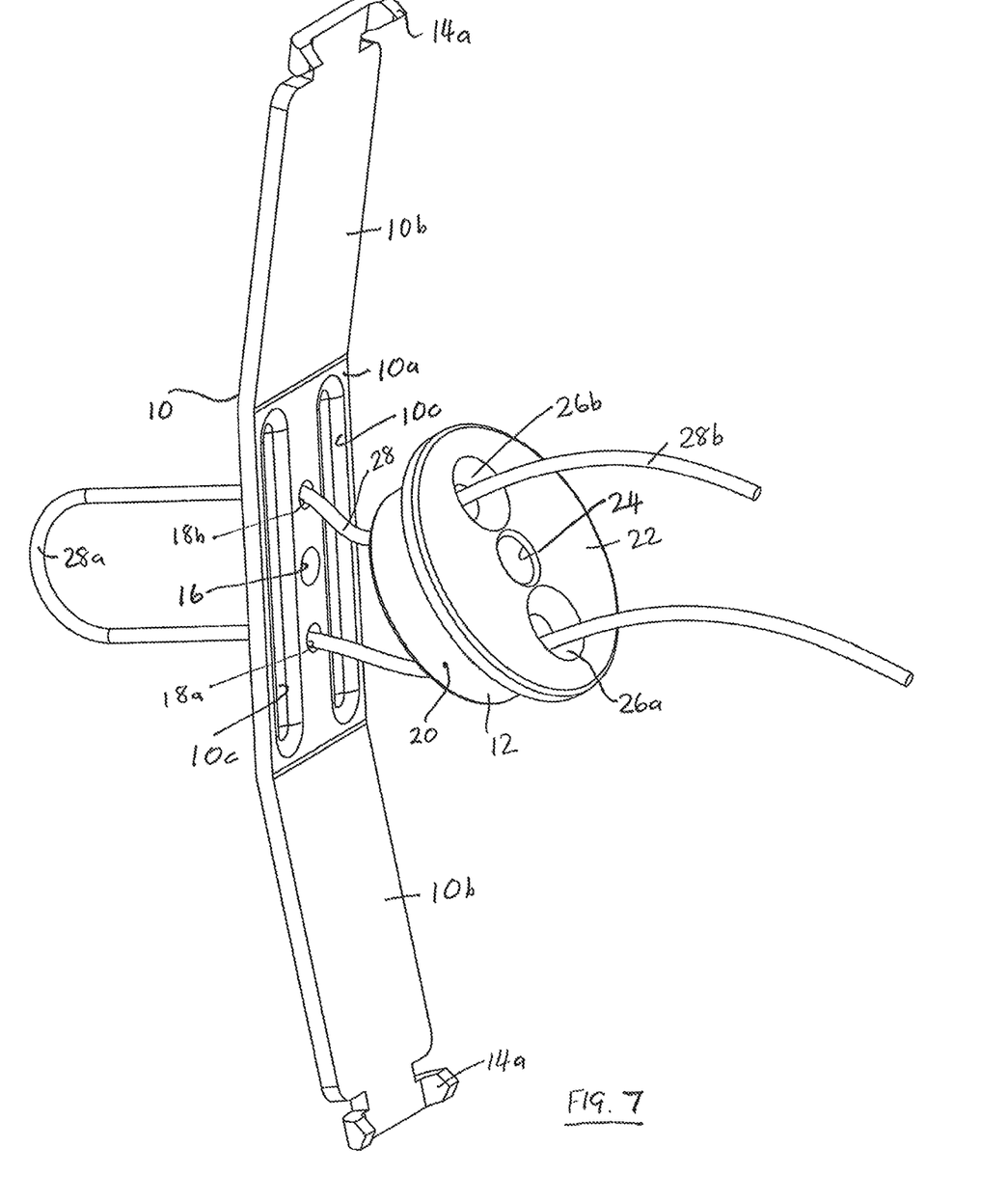
FIG. 7 is a schematic perspective view of a fixing device according to another exemplary embodiment of the present invention.

In yet another exemplary embodiment of the invention, and referring to FIG. 7 of the drawings, the bracing member 10 comprises a single-layered, e.g. metal, plastic or wood, centre portion 10a and a pair of end portions 10b extending at an angle therefrom. In this case, the thickness of the centre portion 10a and the end portions 10b is substantially equal, and a pair of parallel, longitudinal ridges or indented channel portions 10c are provided on the inner surface of the centre portion 10a for the purpose of preventing the centre portion from collapsing at the centre fixing screw, in use, which may, otherwise, cause the bracing member to "gull wing" during tightening of the centre fixing screw. In this case, a pair of laterally opposing, upstanding barbs 14a are provided at the distal end of each end portion 10b, which act as gripping members in a manner similar to that described above.

In other exemplary embodiments of the invention, the gripping members 14 could be replaced by friction pads, such as rubber portions, that serve to provide the required purchase and prevent slipping of the bracing member during fixing. It will be appreciated that a fixing device according to various exemplary embodiments of the present invention may, as described above, be used in plasterboard cavity walls. However, they could equally be used to provide an anchor point on other surfaces, such as hardboard, plywood, sheet metal, etc. and the present invention is not necessarily intended to be in any way limited in this regard.

The invention claimed is:

1. A fixing device for securing into a hole in plasterboard and providing an anchor point for affixing a load to said plasterboard, the device comprising:
    a body configured to be retainable in said hole, wherein said body comprises a generally cylindrical insert portion configured to be inserted into said hole; and
    a resiliently flexible, elongate bracing member of length greater than an axial dimension of said body, said bracing member having a generally central portion of substantially uniform thickness, and end portions extending from said central portion, said end portions tapering to a smaller thickness at their distal ends and said bracing member having an opening for receiving an external retention device for enabling manual retention of said bracing member in a bracing position with an inner surface thereof against the rear of said plasterboard, in use, after insertion thereof through said hole;
    said body and said bracing member each having at least one aperture extending longitudinally therein, said aperture being located on said body and said bracing member respectively for longitudinal alignment, in use, when said body is retained in said hole and said bracing member is in said bracing position so as to define a channel for receiving an attachment device for attaching said bracing member to said body.

2. The fixing device according to claim 1, wherein the inner surface of said bracing member is generally concave.

3. The fixing device according to claim 1, wherein said bracing member is sufficiently resiliently flexible to flex under force.

4. The fixing device according to claim 1, wherein the bracing member comprises a center portion and end portions extending at an angle from said center portion.

5. The fixing device according to claim 4, wherein the thickness of said center portion and said end portions is substantially equal.

6. The fixing device according claim 4, wherein said bracing member is formed of metal or wood.

7. The fixing device according to claim 1, further comprising a gripping member at or adjacent each of the distal ends of said bracing member.

8. The fixing device according to claim 7, comprising a pair of laterally spaced gripping members at or adjacent each of the distal ends of said bracing member.

9. The fixing device according to claim 1, wherein said body comprises a cover portion at one end thereof, having a diameter greater than that of said insert portion and extending circumferentially beyond the side edges of said insert portion.

10. The fixing device according to claim 1, wherein said body and said bracing member each have a pair of apertures extending longitudinally therein, each aperture on said body being located for longitudinal alignment with a corresponding aperture on said bracing member, in use, when said body is retained in said hole and said bracing member is in said bracing position so as to define a pair of respective channels, each for receiving an attachment device for attaching said bracing member to said body.

11. The fixing device according to claim 10, wherein said pair of apertures on said body are located on opposing sides of a generally central point thereof, along a diametric axial axis thereof.

12. The fixing device according to claim 10, wherein said pair of apertures on said bracing member are located on opposing sides of a generally central point thereof, along a longitudinal axis thereof.

13. The fixing device according to claim 10, comprising a pair of flexible tape members, optionally formed of plastic or nylon material, each with a series of spaced apart ridges or teeth formed along at least a portion of its length.

14. The fixing device according to claim 13, wherein the body is provided with at least one ratchet member extending radially inwardly within each of said pair of apertures.

15. The fixing device according to claim 13, wherein the free end of each tape member is configured to be broken or snapped off, once the bracing member has been pulled tightly against the rear of the plasterboard.

16. The fixing device according to claim 13, wherein said tape members comprise a pair of cable ties, each cable tie being threaded through and fastened between corresponding pairs of apertures between said body and said bracing member, said cable ties being configured to be manually tightened, in use, so as to exert a force on said outer surface of said bracing member.

17. A fixing kit for providing an anchor point for affixing a load to plasterboard, the kit comprising a fixing device according to claim 1 and an attachment device configured to be received in a channel to attach a bracing member to a body.

18. A fixing device for securing into a hole in plasterboard and providing an anchor point for affixing a load to said plasterboard, comprising:
    a body configured to be retainable in said hole, wherein said body comprises a generally cylindrical insert portion configured to be inserted into said hole; and
    a resiliently flexible, elongate bracing member of length greater than an axial dimension of said body and having an opening for receiving an external retention device for enabling manual retention of said bracing member in a bracing position with an inner surface thereof against the rear of said plasterboard, in use, after insertion thereof through said hole;
    wherein said body and said bracing member each have a pair of apertures extending longitudinally therein, each aperture on said body being located for longitudinal alignment with a corresponding aperture on said bracing member, in use, when said body is retained in said hole and said bracing member is in said bracing position so as to define a pair of respective channels, each for receiving an attachment device for attaching said bracing member to said body, and
    a retention cord threaded through corresponding pairs of apertures between said body and said bracing member to form a retaining loop across an outer surface of said bracing member with free ends thereof extending through the apertures in said body and configured to enable a user, in use when said inner surface of said bracing member is against the rear of said plasterboard, to exert a force on said outer surface of said bracing member by pulling said free ends.

* * * * *